United States Patent
Adams et al.

(10) Patent No.: US 10,164,972 B2
(45) Date of Patent: *Dec. 25, 2018

(54) TWO-FACTOR USER AUTHENTICATION USING CARD MATRIX

(71) Applicant: Bank of America Corporation, Charlotte, NC (US)

(72) Inventors: Amanda J. Adams, Flint (GB); Lawrence R. LaBella, Bellmore, NY (US)

(73) Assignee: Bank of America Corporation, Charlotte, NC (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/008,633

(22) Filed: Jan. 28, 2016

(65) Prior Publication Data

US 2017/0222996 A1 Aug. 3, 2017

(51) Int. Cl.
*H04L 29/06* (2006.01)

(52) U.S. Cl.
CPC .... *H04L 63/0846* (2013.01); *H04L 2463/082* (2013.01)

(58) Field of Classification Search
CPC ....................................................... H04L 63/08
See application file for complete search history.

(56) References Cited

U.S. PATENT DOCUMENTS

| 9,245,268 | B1 | 1/2016 | Adams et al. | |
|---|---|---|---|---|
| 2005/0144450 | A1* | 6/2005 | Voice | G06F 21/34 713/169 |
| 2005/0144451 | A1* | 6/2005 | Voice | G06F 21/34 713/170 |
| 2006/0015725 | A1* | 1/2006 | Voice | H04L 63/0245 713/168 |
| 2007/0294403 | A1* | 12/2007 | Verona | G06F 17/30306 709/225 |
| 2010/0122320 | A1* | 5/2010 | Merati | H04L 9/006 726/3 |
| 2012/0309436 | A1* | 12/2012 | Lan | H04L 51/38 455/466 |

(Continued)

OTHER PUBLICATIONS

Musa R. Unmehopa et al., "The Support of Mobile Internet Applications in UMTS Networks Through the Open Service Access", 2002, Bell Labs Technical Journal 6, pp. 47-64. (Year: 2002).*

(Continued)

*Primary Examiner* — Luu T Pham
*Assistant Examiner* — Canh Le
(74) *Attorney, Agent, or Firm* — Michael A. Springs (57) ABSTRACT

A system receives a request to authenticate a user and determines a first set of cell identifiers of a card matrix to associate with the user. The system receives a first factor, which comprises a first set of received cell values corresponding to the first set of cell identifiers of the card matrix. The system further determines a first set of stored cell values corresponding to the first set of cell identifiers of the card matrix and compares the first set of received cell values to the first set of stored cell values. The system also receives a second factor, which is different than the first factor. Finally, the system determines that the user is authenticated based at least in part upon the comparison of the first set of receives cell values to the first set of stored cell values.

14 Claims, 2 Drawing Sheets

(56) References Cited

U.S. PATENT DOCUMENTS

2016/0140333 A1* 5/2016 Samineni ............... G06F 21/36
                                                                   726/19

OTHER PUBLICATIONS

Llshoy Francis et al., "A Location Based Secuirty Framework for Authenticating Mobile Phones", 2010, ACM, pp. 1-18. (Year: 2010).*

* cited by examiner

TWO-FACTOR USER AUTHENTICATION USING CARD MATRIX

TECHNICAL FIELD

This invention relates generally to authentication of transactions, and more specifically to two-factor user authentication using card matrix.

BACKGROUND

Customers and users may need to be authorized before taking certain actions, such as performing transactions with various merchants, accessing an enterprise application, or making changes to a user account. Before engaging in any action, the an enterprise may want to authenticate the user. Current authentication techniques are limited.

SUMMARY

According to embodiments of the present disclosure, disadvantages and problems associated with previous enterprise environments in authenticating users may be reduced or eliminated.

In certain embodiments, a system receives a request to authenticate a user and determines a first set of cell identifiers of a card matrix to associate with the user. The system receives a first factor, which comprises a first set of received cell values corresponding to the first set of cell identifiers of the card matrix. The system further determines a first set of stored cell values corresponding to the first set of cell identifiers of the card matrix and compares the first set of received cell values to the first set of stored cell values. The system also receives a second factor, which is different than the first factor. Finally, the system determines that the user is authenticated based at least in part upon the comparison of the first set of receives cell values to the first set of stored cell values.

Certain embodiments of the present disclosure may provide one or more technical advantages. In some embodiments, a system for authenticating a user is operable to store seeds that may generate a card matrix rather than store the card matrix that contains more data. This technique conserves bandwidth and memory consumed by authenticate a user or customer of an enterprise.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is made to the following descriptions, taken in conjunction with the accompanying drawings in which.

DETAILED DESCRIPTION

Figure 1:
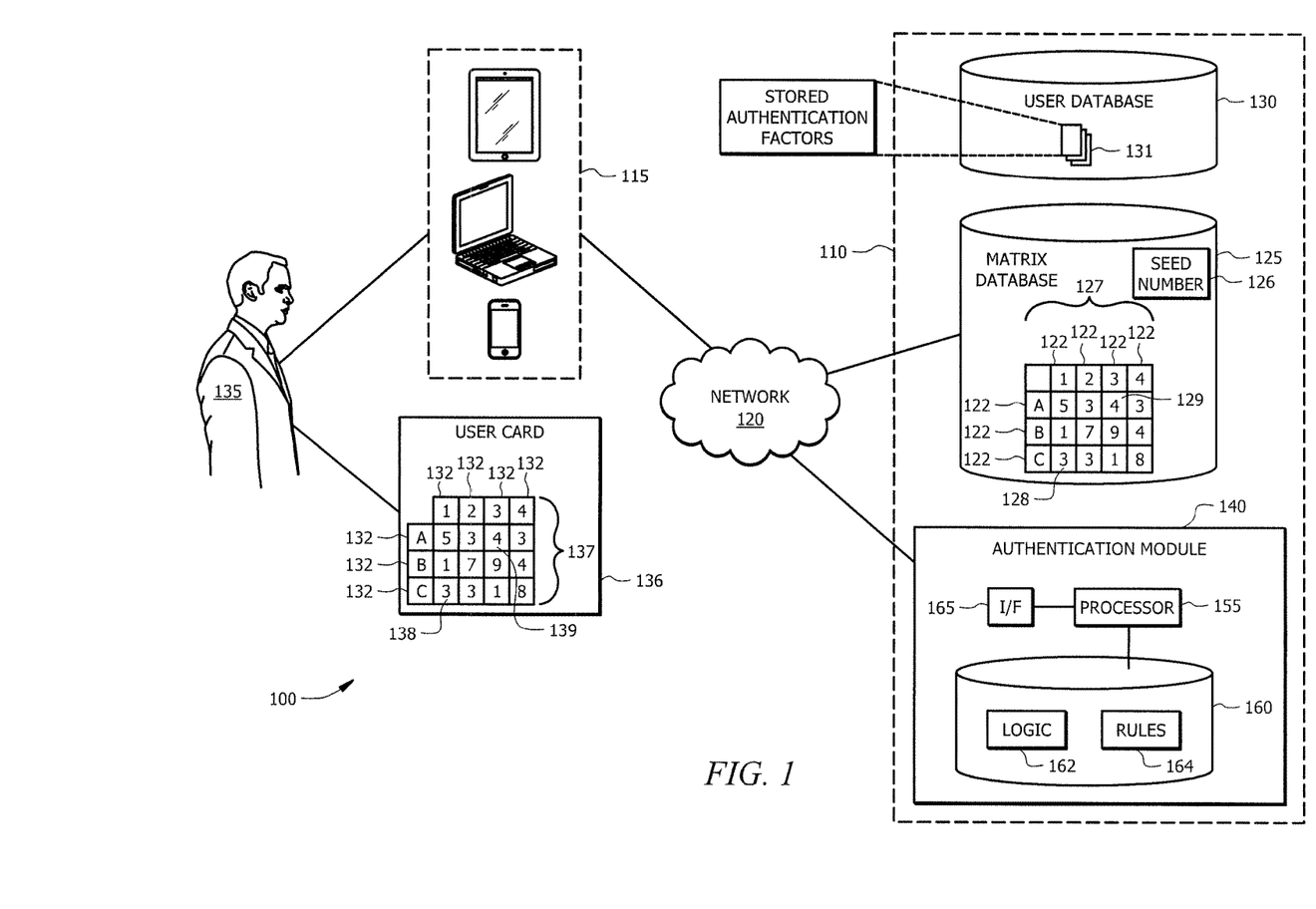
FIG. 1 illustrates an example system that facilitates two-factor user authentication using card matrix.
Figure 2:
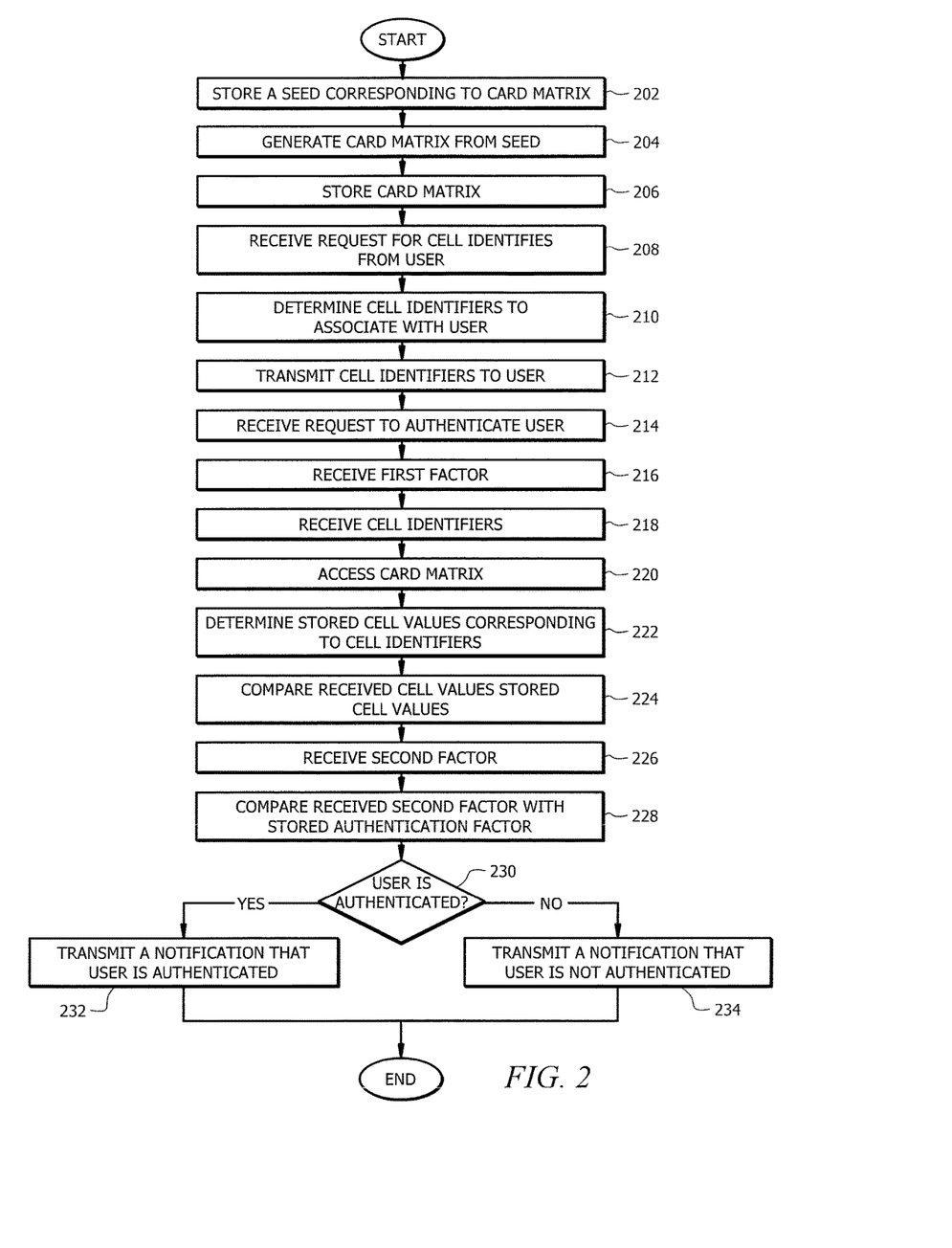
FIG. 2 illustrates an example flowchart for facilitating two-factor user authentication using card matrix.

Embodiments of the present invention and its advantages are best understood by referring to FIGS. 1 and 2, like numerals being used for like and corresponding parts of the various drawings.

Business enterprises, companies, and other institutions that interact with their users or customers may need to authenticate a user before allowing the user to take any actions in relation to the enterprise. Examples of actions a user may want to perform include, but are not limited to, making changes to an account, accessing an enterprise application, and transferring money from one account to another. Typically, the information gathered to authenticate a user may be limited. The teachings of this disclosure recognize that it would be desirable to require two-factor authentication when a user wants to perform actions with the enterprise in order to mitigate the risk of unauthorized actions occurring.

FIG. 1 illustrates an example system 100 that facilitates user authentication. System 100 may include enterprise 110, one or more user devices 115, one or more users 135, one or more user cards 136, one or more authentication modules 140, one or more user databases 130, and one or more matrix databases 125. Enterprise 110 and user devices 115 may be communicatively coupled by network 120. Enterprise 110 is generally operable to facilitate user authentication, as described below.

In general, system 100 facilitates authenticating a user before allowing user 135 to perform some action relating to enterprise 110 (e.g., accessing an account, interacting with application of enterprise 110). In order to be authenticated, user 135 may need to send two separate factors to authenticate module 140. The first factor may include some cell values from card matrix 137 of user card 136. Authentication module 140 may compare these cell values to stored cell values from card matrix 127 that is stored in matrix database 125. Authentication module 140 may require that the cell values match or correspond to the correct cell identifiers 132 or 122. Authentication module 140 may further require user 135 to submit a second factor (e.g., user name, password, biometrics, security question) in order to authenticate user 135. Authentication module 140 may compare the received second factor to stored authentication factors 131 and require a match. Authentication module may authorize user 135 if both the first factor (e.g., cell values) and second factor match the corresponding stored values (e.g., values from matrix 127, stored authentication factors 131).

User device 115 may refer to any device that facilitates user 135 interacting with enterprise 110. In some embodiments, user device 115 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. User device 115 may also comprise any suitable user interface such as a display, microphone, keyboard, or any other appropriate terminal equipment usable by user 135. System 100 may comprise any number and combination of user devices 115. User 135 utilizes user device 115 to interact with authentication module 140, such as receiving cell identifiers 132 or 122 determined and transmitted by authentication module 140, as described below. In some embodiments, user 135 may be a customer of enterprise 110 who is attempting to conduct an activity with enterprise 110, such as making opening the application of enterprise 110.

User card 136 may refer to any card used in authentication, such as a reference card or membership card, that corresponds to user 135 of enterprise 110. User card 136 may comprise card matrix 137 that facilitates user authentication. Card matrix 137 may be generated and printed on user card 136 when user card 136 is created or when it is issued to user 135. Card matrix 137 may be identical to stored matrix 127 to facilitate authenticating user 135. In some embodiments, card matrix 137 comprises one or more cells 138 and 139 that are identified by one or more cell identifiers 132 (e.g., A1-C4). For example, cell 138 corresponds to cell identifier C1, which includes row title (C) and column title (1) of cell 138. As another example, cell 139 corresponds to cell identifier A3. Cells 138 and 139 may comprise cell values; for example, cell 138 has a cell value of 3 and cell 139 has a cell value of 4. In some embodiments, three cell values may be bolded to indicate that those values are the default values for user 135 to communicate to enterprise 110 when authorizing user 135. Although card matrix 137 is illustrated with twelve cells and cell identifiers A1-C4, card matrix 137 may have any number of cells, cell identifiers 132, rows, and columns.

In certain embodiments, enterprise 110 may refer to any organization, entity, business, company, agency, and the like. Enterprise 110 may allow user 135 to interaction with enterprise 110 in order to manage or control some aspect of enterprise 110, such as a financial account of user 135. Enterprise 110 may include one or more authentication modules 140 and one or more matrix databases 125.

Matrix database 125 may refer to any suitable device capable of storing information associated with matrices of user card 136. In certain embodiments, matrix database 125 may store one or more stored authentication matrices 127. Stored authentication matrix 127 may be identical to card matrix 137 printed on user card 136. Stored authentication matrix 127 may comprise cells 128 and 129 corresponding to cell identifiers C1 and A3 and cell values 3 and 4, respectively. Although illustrated with twelve cells and cell identifiers A1-C4, stored authentication matrix 127 may comprise any number of cells, cell identifiers, cell values, rows, and columns.

Matrix database 125 may also include information to correlate user card 136 with stored authentication matrix 127. Therefore, authentication module 140 may be able to access the correct stored authentication matrix 127 to authenticate user 135 before engaging with enterprise 110. In some embodiments, matrix database 125 may store seed 126 corresponding to stored authentication matrix 127. Authentication module 140 may facilitate generating stored authentication matrix 127 from seed 126 stored in matrix database 125. By storing seed 126 rather than the complete stored authentication matrix 127 in matrix database 125, system 100 may conserve the bandwidth and memory consumed by authenticating user 135.

User database 130 may refer to any suitable device capable of storing information associated with user 135. In certain embodiments, user database 130 may store one or more stored authentication factors 131 associated with user 135. Stored authentication factors 131 may be stored data relating to the second factor, such as username, password, biometrics (fingerprint, voice recognition, eye scan), details regarding any registered user devices 115, pin number, security questions, saved images, email addresses, or any other suitable factor that can be used to authenticate user 135. Although FIG. 1 illustrates user database 130 as external to authentication module 140, it should be understood that user database 130 may be internal or external to authentication module 140, depending on particular implementations.

Authentication module 140 may refer to any suitable combination of hardware and/or software implemented in one or more modules to process data and provide the described functions and operations. In some embodiments, the functions and operations described herein may be performed by a pool of authentication modules 140. In some embodiments, authentication module 140 may include, for example, a mainframe, server, host computer, workstation, web server, file server, a personal computer such as a laptop, or any other suitable device operable to process data. In some embodiments, authentication module 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, authentication module 140 receives a request to authenticate user 135 and determines a first set of cell identifiers 122 or 132 of card matrix 137 or 127 to associate with user 135. Authentication module 140 receives a first factor, which comprises a first set of received cell values corresponding to the first set of cell identifiers 132 or 122 of card matrix 137 or 127. Authentication module 140 further determines a first set of stored cell values corresponding to the first set of cell identifiers 132 or 122 of card matrix 137 or 127 and compares the first set of received cell values to the first set of stored cell values. Authentication module 140 also receives a second factor, which is different than the first factor, as explained in detail below. Finally, authentication module 140 determines that the user is authenticated based at least in part upon the second factor and the comparison of the first set of receives cell values to the first set of stored cell values.

Memory 160 may refer to any suitable device capable of storing and facilitating retrieval of data and/or instructions. Examples of memory 160 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Although FIG. 1 illustrates memory 160 as internal to authentication module 140, it should be understood that memory 160 may be internal or external to authentication module 140, depending on particular implementations. Also, memory 160 may be separate from or integral to other memory devices to achieve any suitable arrangement of memory devices for use in system 100.

Memory 160 is generally operable to store logic 162 and rules 164. Logic 162 generally refers to algorithms, code, tables, and/or other suitable instructions for performing the described functions and operations. Rules 164 generally refer to policies or directions for determining the stored cell values corresponding to the cell identifiers and whether to authenticate user 135. Rules 164 may be predetermined or predefined, but may also be updated or amended based on the needs of enterprise 110.

Memory 160 communicatively couples to processor 155. Processor 155 is generally operable to execute logic 162 stored in memory 160 to determine whether user 135 is authenticated according to the disclosure. Processor 155 may comprise any suitable combination of hardware and software implemented in one or more modules to execute instructions and manipulate data to perform the described functions for authentication module 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for authentication module 140, send output from authentication module 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system that allows authentication module 140 to communicate to other devices. Communication interface 165 may include any suitable software operable to access data from various devices such as user devices 115, user database 130, and matrix database 125. Communication interface 165 may also include any suitable software operable to transmit data to various devices such as user devices 115. Communication interface 165 may include one or more ports, conversion software, or both. In general, communication interface 165 may receive a request to authenticate user 135, receive one or more received cell values and cell identifiers 132 or 122, and transmit one or more cell identifiers 132 or 122 to user device 115.

In operation, logic 162 and rules 164, upon execution by processor 155, facilitate receiving a first factor and second factor, comparing the first and second factors to stored authentication factors and stored cell values, and based at least in part upon the comparison, determining whether user 135 is authenticated.

In some embodiments, authentication module 140 receives a request to authenticate user 135. Authentication module 140 may receive the request from user device 115 via network 120. This may occur when user 135 attempts to interact or engage with enterprise 110. For example, when user 135 utilizes his or her user device 115 to access the application of enterprise 110, log into the account of user 135, transfer money from the account of user 135 to another account, open a new account, close an account, change a password, change a setting, or any other interaction with enterprise. By requiring user 135 to be authenticated before allowing user 135 to engage with enterprise 110, authentication module 140 may reduce or eliminate the risk of fraud. For example, if a third party attempts to transfer money from the account of user 135 into the third party's account without permission, third party would not be able to access the account of user 135 without also having user card 136.

In some embodiments, authentication module 140 receives a request from user 135 to identify cell identifiers 122. User 135 may transmit this request from user device 110 via network 120. User 135 may use user device 115 to request a set of cell identifiers from authentication module 140 using a text message, a telephone call, an application of enterprise 110, or any other suitable means of communication with authentication module 140. In some embodiments, authentication module 140 may require the request to come from an authorized user device 115. For example, user 135 may register user devices 115 such as a phone, tablet, or computer that can send requests for cell identifiers. As another example, if user 135 utilizes a friend's phone to send a text message to request cell identifiers, authentication module 140 will recognize that it is not an authorized device and send an error message. This prevents a third party from requesting cell identifiers and reduces the likelihood of a third party being authenticated to perform unauthorized transactions. Thus, in order to perform an unauthorized transaction, a third party would need the physical card 136 as well as a registered user device 115 for user 135.

In some embodiments, authentication module 140 determines a set of cell identifiers 122 or 132 to associate with user 135 and transmits the set of cell identifiers 122 to user 135. Authentication module 140 may transmit the cell identifiers to user device 115 via network 120. For example, authentication module 140 may determine user 135 may be authenticated by providing cell values corresponding to cell identifiers B1, A4, and C3. Continuing the example, authentication module 140 may transmit those cell identifiers B1, A4, and C3 to user device 115 so that user 135 knows to provide the cell values 1, 3, and 1 to enterprise 110. In some embodiments, authentication module 140 may determine and transmit cell identifiers to user 135 on a regular basis (e.g., weekly, daily, or month) for user 135 to provide corresponding cell values to enterprise 110 when interacting with enterprise 110. In certain embodiments, authentication module 140 may determine and transmit cell identifiers in response to user 135 sending a request for cell identifiers utilizing user device 115 to authentication module 140 via network 140. For example, user device 115 may communicate the request for cell identifiers when user 135 is signing in to the application of enterprise 110.

Authentication module 140 may determine the set of cell identifiers using a table of predetermined sets of cell identifiers (i.e., stored in memory 160), a random number generator (i.e., as indicated by rules 164), or any other suitable technique. In some embodiments, authentication module 140 determines a new set of cell identifiers on a periodic basis, such as daily, weekly, monthly, or any varied period of time. This provides for additional security because the required values to make a purchase with one of merchants 130a-b are periodically changing. Thus, if a third party determines the cell values required to authenticate user 135 at one point in time, the third party will not be able to use the same cell values once authentication module 140 determines a new set of cell identifiers. This reduces or eliminates the risk that a third party with access to a user's card number engages in fraud.

In some embodiments, authentication module 140 transmits a second set of cell identifiers 122 to user 135. This may occur, for example when the first set of cell identifiers 122 expire after a certain amount of time. In some embodiments, cell identifiers associated with user 135 may expire after a predetermined number of uses. Authentication module 140 may determine that user 135 is not authenticated if it receives cell values corresponding to an expired set of cell identifiers. For example, the set of cell identifiers associated with user 135 may expire after ten uses. In response to the set of cell identifiers being used ten times, authentication module 140 may transmit a new set of cell identifiers user 135.

In some embodiments, authentication module 140 receives a first factor. The first factor may include a set of received cell values and a set of cell identifiers 122 or 132. In some embodiments, the first factor includes just the cell values because enterprise 110 has previously communicated the cell identifiers 122 or 132 that user 135 should use for transactions (i.e., enterprise 110 communicates periodically, enterprise 110 communicates in response to a request by user 135). For example, enterprise 110 may inform user 135 to transmit the cell values corresponding to cell identifiers A2, B3, and C4. Continuing the example, user 135 utilizing user device 115 may provide cell values 3, 9, and 8 to authentication module 140. In certain embodiments, user 135 may choose which cell identifiers 122 or 132 to use for authentication and may transmit both cell identifiers and corresponding cell values to authentication module 140 to authenticate user 135. Authentication module 140 may receive the first factor through the application of enterprise 110, text message from registered user device 115, phone call from registered user device 115, or any other suitable medium for transmitting the first factor.

In some embodiments, authentication module 140 determines a set of stored cell values corresponding to the first set of cell identifiers 132 or 122 of card matrix 137 or 127. Authentication module 140 may determine the stored cell values from stored authentication matrix 127. For example, authentication module 140 determines that cell 128 corresponds to cell identifier C1 and contains cell value 3. As another example, authentication module 140 determines that cell 129 corresponds to cell identifier A3 and contains cell value 4.

In some embodiments, authentication module 140 accesses stored authentication matrix 127 stored in matrix database 125 in order to determine the cell values corresponding to the cell identifiers of stored authentication matrix 127. Matrix database 125 may store the entire stored authentication matrix 127 and authentication module 140 may retrieve stored authentication matrix 127 and determine the cell values. In certain embodiments, authentication module 140 stores seed 126 corresponding to stored authentication matrix 127 in matrix database 125 and generates stored authentication matrix 127 from seed 126 in order to determine the cell values corresponding to the cell identifiers. For example, authentication module 140 may access seed 126 in matrix database 125 and use seed 126 to generate stored authentication matrix 127. By storing seed 126 and generating stored authentication matrix 127 each time it needs to be accessed, system 100 may reduce the memory required in system 100 because seed 126 comprises less data than stored authentication matrix 127 itself.

In some embodiments, authentication module 140 compares a set of received cell values to the set of stored cell values. Authentication module 140 may determine whether the received cell values and the stored cell values are identical. For example, authentication module determines that received cell values 3 and 4 (corresponding to cell identifiers C1 and A3 of card matrix 137, respectively) are an identical match to stored cell values 3 and 4 (corresponding to cell identifiers C1 and A3 of stored authentication matrix 127, respectively). Based on this comparison, authentication module 140 may determine whether user 135 is authenticated. For example, if the received cell values and the stored cell values are an identical match, authentication module 140 may determine that user 135 is authenticated. As another example, if only one of the received cell values matches the stored cell values, then authentication module 140 may determine that user 135 is authenticated. Further, by requiring user 135 to provide multiple cell values, authentication module 140 lessens the likelihood that a third party not in possession of user card 136 may simply guess the cell value numbers when attempting to interact with enterprise 110.

In some embodiments, authentication module 140 receives a second factor. The second factor can be a username, password, biometrics (fingerprint, voice recognition, eye scan), registered user device 115, pin number, security question, challenge/response, token, image, clicking a link in an email sent to the registered address of user 135, or any other suitable factor that can be used to authenticate user 135. Authentication module 140 may receive the second factor from user device 115 via network 120. In some embodiments, the second factor may be combined with the first factor and received by authentication module at the same or different time. For example, enterprise 110 may call user 135 on a registered user device 115 and tell user 135 the cell identifiers to use. Continuing the example, user 135 may say the cell values that correspond to those cell identifiers out loud. Thus, authentication module may receive the first factor (e.g., cell values) and second factor (e.g., voice recognition) at the same or substantially the same time.

In some embodiments, authentication module 140 compares the second factor to stored authentication factor 131. Stored authentication factor 131 may be stored data relating to the second factor, such as username, password, biometrics (fingerprint, voice recognition, eye scan), details regarding any registered user devices 115, pin number, security questions, saved images, email addresses, challenge/response, token, or any other suitable factor that can be used to authenticate user 135. Authentication module 140 compares the second factor that was received from user 135 to stored authentication factor 131 to determine whether they match. For example, if user 135 supplies a username and password, authentication module 140 will access stored authentication factor 131 relating to the username and password of user 135 to determine whether they are identical, and thus authenticate user 135. As another example, user 135 may say three numbers over the phone and authentication module 140 may capture the voice of user 135. Continuing the example, authentication module 140 may compare the voice captured to stored authentication factor 131 corresponding to the voice or voice recognition of user 135 and determine whether there is a sufficient match to authenticate user 135. By requiring a second factor for authentication, authentication module 140 ensures that a third party who simply has possession of user card 136 must have an additional piece of information before being able to interact with enterprise 110, thus reducing the likelihood that the third party access any of the information of user 135 without permission.

In some embodiments, authentication module 140 determines whether user 135 is authenticated. This determination may be based at least in part upon the second factor, the comparisons of the second factor to stored authentication factors 131, and the comparison of the set of received cell values and the set of stored cell values (e.g., the first factor). For example, authentication module 140 may determine that the second factor matches the stored authentication factor 131 and the set of received cell values match the set of stored cell values, thus authenticating user 135. As another example, authentication module 140 may determine that the second factor matches the stored authentication factor and the set of received cell values are a partial match to the set of stored cell values, which may be sufficient to authenticate user 135.

In an exemplary embodiment of operation, user utilizes user device 115 to interact with enterprise 110 (i.e., log in to application of enterprise 110, perform an action related to the account of user 135) and requests to be authenticated. Enterprise 110 may determine a set of cell identifiers user 135 should use to be authenticated and communicate those cell identifiers to user device 115 (e.g., text message, phone call, application message). User 135 may refer to user card 136 to determine the cell values that correspond to the cell identifiers and transmit those cell identifiers to enterprise 110 as a first factor (e.g., through an application, phone call, text message). User may transmit a second factor (e.g., username, password, biometrics, picture) to enterprise 110 as well. Authentication module 140 may compare the received cell values to the stored cell values and the second factor to stored authentication factors 131 to determine whether the factors match. If so, authentication module 140 may determine whether user 135 is authenticated and able to engage with enterprise 110.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the invention. For example, system 100 may include any number of users 135, user devices 115, user cards 136, matrix databases 125, authentication modules 140, and enterprises 110. As another example, stored authentication matrix 127, and/or its corresponding seed 126, may be stored in matrix database 125 or memory 160 of authentication module 140. As another example, particular functions, such as generating stored authentication matrix 127, may be performed by a separate component (e.g., matrix database 125) and authentication module 140 may receive stored authentication matrix 127. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

FIG. 2 illustrates an example flowchart for facilitating user authentication. At step 202, in some embodiments, authentication module 140 may store seed 126 corresponding to stored authentication matrix 127. Authentication module 140 may store seed 126 in matrix database 125 or memory 160 of authentication module 140. In some embodiments, seed 126 may be a random or pseudo-random number that, when accessed by authentication module 140, facilitates generating the corresponding stored authentication matrix 127. Authentication module 140 may store seed 126 when user card 136 is issued or created, when seed 126 is first created, or at any time while user 135 utilizes user card 136.

At step 204, in some embodiments, authentication module 140 generates stored authentication matrix 127 from seed 126. In some embodiments, authentication module 140 may generate stored authentication matrix 127 from seed 126 at the time seed 126 is created. For example, authentication module 140 may generate stored authentication matrix 127 and at the time of its initial generation, may store matrix 127 at step 206 for authentication module 140 to later access at step 220. Authentication module 140 may also generate stored authentication matrix 127 after a request is received to authenticate user at step 214. For example, matrix database 125 may store a plurality of seeds corresponding to a plurality of stored authentication matrices 127 rather than storing matrices 127 themselves. Because seed 126 may comprise less data than stored authentication matrix 127, enterprise 110 may save memory or space by storing a plurality of seeds 126 and generating stored authentication matrix 127 each time it is needed, rather than storing a plurality of stored authentication matrices 127 themselves.

At step 206, in some embodiments, authentication module 140 stores authentication matrix 127. Authentication module 140 may store authentication matrix 127 in matrix database 125 or in memory 160 of authentication module 140. Authentication module 140 may store authentication matrix 127 when seed 126 is created, when user card 126 is issued, when stored authentication matrix 127 is generated using seed 126 at step 204, or at any other point while user 135 utilizes user card 126. In some embodiments, authentication module 140 may store stored authentication matrix 127 itself, rather than storing seed 126 at step 202 and generating stored authentication matrix 127 at step 204 each time matrix 127 is needed. For example, authentication module 140 may store authentication matrix 127 when user card 126 is created and keep it stored for the duration of the time user 135 owns user card 136. By storing stored authentication matrix 127, authentication module 140 may save processing resources of system 100 because authentication module 140 would not have to generate stored authentication matrix 127 each time a request is made to authenticate user 135.

At step 208, in some embodiments, authentication module 140 receives a request for cell identifiers 122 or 132 from user 135. User device 115 may transmit a request for cell identifiers 122 or 132 to authentication module 140 via network 120. User 135 may request cell identifiers, for example, when attempting to log in to the website of enterprise 110. In some embodiments, user device 115 may request cell identifiers 122 or 132 on a periodic basis (i.e., weekly, monthly) such that user 135 knows what cell identifiers 122 or 132 to use in advance of requesting authentication.

At step 210, in some embodiments, authentication module 140 determines one or more cell identifiers 122 or 132 to associate with user 135. Authentication module 140 may determine any cell identifiers 122 from stored authentication matrix 127 to associate with user 135 and user card 136. For example, authentication module 140 may determine cell identifiers A1, B2, and C3 to associate with user 135 and user card 136. Authentication module 140 may determine any number of cell identifiers 122 to associate with user 135 and user card 136. For example, authentication module 140 may determine four distinct cell identifiers 122 (e.g., B3, C2, D1, A2), four cell identifiers 122 with at least one repeated (e.g., A1, B2, A1, A2), or only one cell identifier 122 (e.g., B4). In some embodiments, determining cell identifiers 122 and associating the determined cell identifiers 122 with user 135 and user card 136 requires the cell values corresponding to these cell identifiers to be received by enterprise 110 in order to authenticate user 135, for example when receiving the first factor at step 216.

At step 212, in some embodiments, authentication module 140 may transmit the one or more determined cell identifiers 122 or 132 to user 135 at user device 115 via network 120. Authentication module 140 may send these determined cell identifiers 122 or 132 using interface 165. In some embodiments, user 135 receives the determined cell identifiers 122 or 132 and is notified to use these cell identifiers 122 or 132 when authenticating user 135. For example, authentication module 140 may send a message to user device 115 that informs user 135 to provide the cell values corresponding to cell identifiers A3, C1, and D2 when logging on to the website of enterprise 110. In some embodiments, authentication module 140 may transmit instructions to user device 115 on how to display the information on user device 115. For example, authentication module 140 may transmit a shape to be illuminated on the screen of user device 115, where the shape would indicate which cell identifiers 122 or 132 that user 135 should use to be authenticated. This provides an additional level of security because the shape itself does not give information on specific cell values that correspond to certain cell identifiers. For example, if the shape is a square that highlights the top four cells of matrix 127 (i.e., the cells corresponding to cell identifiers A1, A2, B1, and B2), the user could transmit those values in an order (i.e., 7351; 3571; 3175). Authentication module 140 simple understands what four values it needs to authenticate user. However, any third party that sees the transmission of these values will not understand that cell value 5 is in the cell corresponding to A1. This highlighting feature reduces the likelihood that a third-party intercepts the cell values and is able to use those for any future authentication.

In some embodiments, authentication module 140 may perform step 210 and/or step 212 after authentication module 140 receives a request to authenticate user 135 at step 214. For example, authentication module 140 may receive the request to authenticate user 135, which may then prompt authentication module 140 to transmit cell identifiers A2, B4, A1 to user device 115 and inform user 135 to provide the corresponding cell values. In some embodiments, authentication module 140 may transmit the determined cell identifiers 122 or 132 in response to a request from user 135, for example at step 208. For example, user 135 may use enterprise application on user device 115 to submit a request to enterprise 110 to send cell identifiers 122 or 132 for user authentication. By determining the cell identifiers for user 135 to provide, authentication module 140 may reduce or eliminate the risk of fraud. Even if a third party had some cell values used to authentication user 135 previously, the third party would not know which cell identifiers 122 or 132 to use to authenticate user 135 in a new instance, because authentication module 140 only transmits the cell identifiers to user 135, not the third party.

In some embodiments, authentication module 140 may determine cell identifiers at step 210 and transmit these cell identifiers at step 212 on a regular basis (e.g., weekly, daily or monthly) to notify user 135 to use these cell identifiers 122 or 132 to authenticate user 135. In some embodiments, the transmitted cell identifiers 122 or 132 may expire after a period of time. For example, the transmitted cell identifiers 122 or 132 may only be used to authenticate user 135 within the next hour, day, week, or month. In some embodiments, the transmitted cell identifiers 122 or 132 expire after a predetermined number of uses. For example, user 135 may only use transmitted cell identifiers 122 or 132 to authenticate user 135 for a total of 3 interactions with enterprise 110. Once the cell identifiers 122 or 132 have been used the predetermined number of times, user 135 may request additional cell identifiers 122 or 132 or authentication module 140 may automatically determine and transmit additional cell identifiers 122 or 132.

In some embodiments, steps 210 and 212 may be omitted because user 135 may provide the corresponding cell identifiers 122 or 132 to authentication module 140 when providing the cell values. For example, at step 218, authentication module 140 may receive one or more corresponding cell identifiers of card matrix 137. User 135 may determine which cell identifiers 122 or 132 to use for authentication and transmit both the cell identifiers 122 or 132 (e.g., at step 218) and the corresponding cell values (e.g., at step 216) to authentication module 140. This would allow authentication module 140 to omit steps 210 and 212 when authenticating user 135.

At step 214, in some embodiments, authentication module may receive a request to authenticate user 135. Authentication module 140 may receive this request at interface 165 from user device 115 via network 120. In some embodiments, the request may occur automatically when user 135 attempts to interact with enterprise 110. For example, when user 135 logs in to the application of enterprise 110 from user device 115 or when user 135 attempts to change a pin number associated with the account of user 135, user device 115 may send a request to authenticate user 135 to authentication module 140.

At step 216, in some embodiments, authentication module 140 receives a first factor to use in authenticating user 135. In some embodiments, the first factor may be a set of cell values corresponding to the one or more cell identifiers 132 of card matrix 137. Authentication module 140 may receive these cell values from user device 115 via network 120 at interface 165. For example, user 135 may send cell values 5, 7, and 1, which correspond to cell identifiers A1, B2, and C3, in order to authenticate user 135.

At step 218, in some embodiments, authentication module 140 may receive one or more cell identifiers 132 of card matrix 137. Authentication module 140 may receive the cell identifiers 132 from user device 115 via network 120 at interface 165. In some embodiments, user 135 may select certain cell identifiers 132. For example, user 135 may provide cell values corresponding to cell identifiers A4, B3 and C2. User 135 may transmit both the cell identifiers A4, B3 and C2 along with the cell values 3, 9, and 3 to authentication module 140 to authenticate user 135. In some embodiments, a third party may select the cell identifiers that user 135 should use. For example, user device 115 may have a random generator to determine what cell identifiers 132 to use for authentication. User 135 may use this third-party random generator, which indicates what cell identifiers 132 to use, and then user 135 may transmit both cell identifiers (as identified by the third party) and the corresponding cell values to enterprise 110.

In some embodiments, step 218 may be omitted because authentication module 140 may have already determined cell identifiers 132 to be used to authenticate user 135. Cell identifiers 132 to be used to authenticate user 135 may be cell identifiers 132 determined at step 210 and transmitted to user 135 at step 212. For example, authentication module 140 may determine and transmit cell identifiers A2, B2, and C3 of stored authentication matrix 127 to user 135 in order to authenticate user 135. Continuing the example, user 135 may provide to authentication module 140 the corresponding cell values 5, 7, and 1. By not providing both the cell values and the corresponding cell identifiers to authentication module 140, but rather providing only the cell values, any third party that accesses records of user device 115 would not be able to determine which cell values corresponding to which cell identifiers. Therefore, this embodiment reduces the likelihood of a third party being able to successfully authenticated as user 135 because, even after accessing the records of user 135, the third party would not be able to provide the appropriate cell values to be authenticated as user 135.

At step 220, in some embodiments, authentication module 140 accesses stored authentication matrix 127. Authentication module 140 may access stored authentication matrix 127 from matrix database 125 or memory 160. In certain embodiments, authentication module 140 may access stored authentication matrix 127 directly because it is stored in its entirety in matrix database 125 or memory 160. In some embodiments, authentication module 140 may access seed 126 corresponding to stored authentication matrix 127 and then generate stored authentication matrix 127, which can be performed using one or more techniques discussed above with respect to step 204.

At step 222, in some embodiments, authentication module 140 may determine a set of stored cell values corresponding to a set of cell identifiers 132 or 122. Cell identifiers 132 or 122 may be those that authentication module 140 determined and transmitted in steps 210 and 212 or may be those that authentication module 140 received at step 218 from user device 115. Authentication module 140 may determine the stored cell values by identifying the cells in stored authentication matrix 127 corresponding to the received or transmitted cell identifiers 132 or 122. For example, if the cell identifiers are C1 and A3, authentication module 140 identifies cells 128 and 129 and determines that the stored cell values corresponding to cell identifiers C1 and A3 are 3 and 4, respectively.

At step 224, in some embodiments, authentication module 140 compares the cell values received as the first factor at step 216 to the stored cell values determined at step 222. Authentication module 140 may determine the received cell values and the stored cells values are an identical match, a partial match, or no match at all. For example, if authentication module 140 receives cell values 5, 7 and 2 and compares it to stored cell values 5, 7 and 1, authentication module 140 may determine that the received cell values and stored cell values are only a partial match. As another example, authentication module 140 may compare received cell values 1, 3, and 9 corresponding to cell identifiers B1, C2 and B3 with cell values 1, 3, and 9 corresponding to cell identifiers B1, C2, and B3 of stored authentication matrix 127. Continuing the example, authentication module 140 determines that the received cell values and the stored cell values are an exact match.

At step 226, in some embodiments, authentication module 140 receives a second factor to use in authenticating user 135. The second factor may be a username, password, biometrics (fingerprint, voice recognition, eye scan), registered user device 115, pin number, security question, image, challenge/response, tokens, clicking a link in an email sent to the registered address of user 135, or any other suitable factor that can be used to authenticate user 135. Authentication module 140 may receive the second factor from user device 115 via network 120.

At step 228, in some embodiments, authentication module 140 compares the second factor to stored authentication factor 131. Stored authentication factor 131 may be stored data relating to the second factor, such as username, password, biometrics (fingerprint, voice recognition, eye scan), details regarding any registered user devices 115, pin number, security questions, challenge/response, tokens, saved images, email addresses, or any other suitable factor that can be used to authenticate user 135. Authentication module 140 compares the second factor that was received from user 135 at step 226 to stored authentication factor 131 to determine whether they match. By requiring a second factor for authentication, authentication module 140 ensures that a third party who simply has possession of user card 136 must have an additional piece of information before being able to interact with enterprise 110, thus reducing the likelihood that the third party accesses any of the information of user 135 without permission.

At step 230, in some embodiments, authentication module 140 determines whether user 135 is authenticated. This determination may be based at least in part upon the second factor, the comparisons of the second factor to stored authentication factors 131, and the comparison of the set of received cell values and the set of stored cell values. For example, authentication module 140 may determine that the second factor matches the stored authentication factor 131 and the set of received cell values match the set of stored cell values, thus authenticating user 135. As another example, authentication module 140 may determine that the second factor matches the stored authentication factor and the set of received cell values are a partial match to the set of stored cell values, which may be sufficient to authenticate user 135. If, at step 230, authentication module 140 determines that user 135 is authenticated, the method continues to step 232. If, at step 230, authentication module 140 determines that user 135 is not authenticated, the method continues to step 234.

At step 232, in some embodiments, authentication module 140 transmits a notification that user 135 is authenticated. Authentication module 140 may transmit the notification through interface 165 to user device 115 or another application of enterprise 110 via network 120. Once user device 115 or another application of enterprise 110 receives the notification that user 135 is authenticated, it may allow user 135 to interact with enterprise 110. For example, user 135 may be able to perform whatever action user 135 was seeking when it requested to be authenticated, such as changing a pin number, transferring money from an account, or accessing financial information of user 135. As another example, user 135 may be able to log into and access application of enterprise 110 (e.g., application on user device 115). After authentication module 140 transmits the notification that user 135 is authenticated the method ends.

At step 234, in some embodiments, authentication module 140 may transmit a notification that user 135 is not authenticated if it determined at step 230 that user 135 is not authenticated. Authentication module 140 may transmit the notification from interface 165 to user device 115 and/or another application of enterprise 110 via network 120. If another application of enterprise 110 or user device 115 receives the notification that user 135 is not authenticated, it may prompt user 135 to provide additional factors to authenticate the identity of user 135 (e.g., additional cell identifiers and/or additional cell values). In some embodiments, authentication module 140 may only allow user 135 to submit a maximum number of additional factors to authenticate user 135. For example, if user 135 fails to provide correct cell identifiers and/or cell values that correspond with each other after three attempts, the account of user 135 may be frozen and/or user 135 may be locked out of logging into the account of user 135. This may further mitigate the risk of fraud by a third party. After authentication module 140 transmits the notification either that user 135 is or is not authenticated, the method ends.

Modifications, additions, or omissions may be made to the methods described herein without departing from the scope of the invention. For example, the steps may be combined, modified, or deleted where appropriate, and additional steps may be added. For example, steps 232 and 234 may be omitted and rather than transmit a notification that user 135 is authenticated, authentication module 140 may only determine that user 135 is authenticated at step 230, after which the method ends. Additionally, the steps may be performed in any suitable order without departing from the scope of the present disclosure. For example, transmitting cell identifiers to user 135 at step 212 may be performed after authentication module 140 receives a request to authenticate user 135 at step 214. While discussed as authentication module 140 performing the steps, any suitable component of system 100 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An authentication system, comprising:
    a memory configured to store an authentication matrix, the authentication matrix comprising a plurality of cell identifiers and a plurality of cell values corresponding to the plurality of cell identifiers;
    an interface configured to:
    receive a first request to authenticate a user;
    receive a second request to identify cell identifiers in order to authenticate the user, the second request received from a user device; and
    one or more hardware processors communicatively coupled to the interface and configured to:
        determine whether the user device is an authorized user device by determining whether the user has registered the user device;
        in response to determining that the user device is an authorized user device, determine, using a random number generator, a first set of cell identifiers of the authentication matrix to associate with the user, wherein the first set of cell identifiers associated with the user expire after a first time;
    wherein the interface is further configured to:
        transmit the first set of cell identifiers to the user device, the first set of cell identifiers listed in a first order;
        receive a first factor, the first factor comprising a first set of received cell values corresponding to the first set of cell identifiers of the authentication matrix, wherein the first set of received cell values corresponding to the first set of cell identifiers are listed in a second order, the second order being different than the first order;
        receive a second factor, the second factor being different than the first factor;
    wherein the one or more hardware processors are further configured to:
        determine a first set of stored cell values corresponding to the first set of cell identifiers of the authentication matrix, the first set of stored cell values listed in the first order;
        compare the first set of received cell values to the first set of stored cell values;
        determine that the first set of stored cell values are listed in the first order and the first set of received cell values are listed in the second order;
        determine that the first set of stored cell values and the first set of received cell values are at least a partial match, despite being arranged in different orders;
        in response to determining that the first set of stored cell values and the first set of received cell values are at least a partial match, request a second factor from the user device, the second factor being user-generated data;
        determine that the second factor matches a stored authentication factor; and
        determine that the user is authenticated based at least in part upon the determination that the second factor matches the stored authentication factor and the comparison of the first set of received cell values to the first set of stored cell values.

2. The system of claim 1, wherein the one or more processors are further configured to:
    compare the second factor to a stored authentication factor; and
    determine that the user is authenticated based at least in part upon the comparison of the second factor to the stored authentication factor.

3. The system of claim 1, wherein:
    the one or more processors are further configured to:
        determine a second set of cell identifiers of the authentication matrix to associate with the user; and
    the interface is further configured to:
        transmit the first set of cell identifiers to the user at a first time;
        transmit the second set of cell identifiers to the user at a second time; and
    wherein the first time and the second time are different.

4. The system of claim 1, wherein the first set of cell identifiers expire after a predetermined number of uses.

5. A non-transitory computer-readable medium encoded with logic, the logic configured when executed to:
    store an authentication matrix, the authentication matrix comprising a plurality of cell identifiers and a plurality of cell values corresponding to the plurality of cell identifiers;
    receive a first request to authenticate a user;
    receive a second request to identify one or more cell identifiers in order to authenticate the user, the second request received from a user device;
    determine whether the user device is an authorized user device by determining whether the user has registered the user device;
    in response to determining that the user device is an authorized user device:
        determine, using a random number generator, a first set of cell identifiers of the authentication matrix to associate with the user, wherein the first set of cell identifiers associated with the user expire after a first time;
        transmit the first set of cell identifiers to the user device, the first set of cell identifiers listed in a first order;
        receive a first factor, the first factor comprising a first set of received cell values corresponding to the first set of cell identifiers of the authentication matrix, wherein the first set of received cell values corresponding to the first set of cell identifiers are listed in a second order, the second order being different than the first order;
        determine a first set of stored cell values corresponding to the first set of cell identifiers of the authentication matrix, the first set of stored cell values listed in the first order;
        compare the first set of received cell values to the first set of stored cell values;
        determine that the first set of stored cell values are listed in the first order and the first set of received cell values are listed in the second order;
        determine that the first set of stored cell values and the first set of received cell values are at least a partial match, despite being arranged in different orders;
        in response to determining that the first set of stored cell values and the first set of received cell values are at least a partial match, request a second factor from the user device, the second factor being user-generated data;

receive a second factor, the second factor being different than the first factor;

determine that the second factor matches a stored authentication factor; and determine that the user is authenticated based at least in part upon the determination that the second factor matches the stored authentication factor and the comparison of the first set of received cell values to the first set of stored cell values.

6. The computer-readable medium of claim 5, wherein the logic is further configured to:

compare the second factor to a stored authentication factor; and determine that the user is authenticated based at least in part upon the comparison of the second factor to the stored authentication factor.

7. The computer-readable medium of claim 5, wherein the logic is further configured to:

transmit the first set of cell identifiers to the user at a first time;

determine a second set of cell identifiers of the authentication matrix to associate with the user;

transmit the second set of cell identifiers to the user at a second time; and wherein the first time and the second time are different.

8. The computer-readable medium of claim 5, wherein the first set of cell identifiers expire after a predetermined number of uses.

9. The computer-readable medium of claim 5, wherein the logic is further configured to store, in a memory, the authentication matrix, wherein determining the first set of stored cell values comprises accessing the authentication matrix.

10. An authentication method, comprising:

storing, in a memory, an authentication matrix, the authentication matrix comprising a plurality of cell identifiers and a plurality of cell values corresponding to the plurality of cell identifiers;

receiving, at an interface, a first request to authenticate a user;

receiving, at the interface, a second request to identify one or more cell identifiers in order to authenticate the user, the second request received from a user device;

determining, using a processor, whether the user device is an authorized user device by determining whether the user has registered the user device;

in response to determining that the user device is an authorized user device:

determining, using the processor and a random number generator, a first set of cell identifiers of the authentication matrix to associate with the user, wherein the first set of cell identifiers associated with the user expire after a first time;

transmitting, using the interface, the first set of cell identifiers to the user device, the first set of cell identifiers listed in a first order;

receiving, at the interface, a first factor, the first factor comprising a first set of received cell values corresponding to the first set of cell identifiers of the authentication matrix, wherein the first set of received cell values corresponding to the first set of cell identifiers are listed in a second order, the second order being different than the first order;

determining, using the processor, a first set of stored cell values corresponding to the first set of cell identifiers of the authentication matrix, the first set of stored cell values listed in the first order;

comparing, using the processor, the first set of received cell values to the first set of stored cell values;

determining, using the processor, that the first set of stored cell values are listed in the first order and the first set of received cell values are listed in the second order;

determining, using the processor, that the first set of stored cell values and the first set of received cell values are at least a partial match, despite being arranged in different orders;

in response to determining that the first set of stored cell values and the first set of received cell values are at least a partial match, requesting a second factor from the user device, the second factor being user-generated data;

receiving, at the interface, the second factor, the second factor being different than the first factor;

determining, using the processor, that the second factor matches a stored authentication factor; and determining, by the processor, that the user is authenticated based at least in part upon the determination that the second factor matches the stored authentication factor and the comparison of the first set of received cell values to the first set of stored cell values.

11. The method of claim 10, further comprising:

comparing, using the processor, the second factor to a stored authentication factor; and determining, by the processor, that the user is authenticated based at least in part upon the comparison of the second factor to the stored authentication factor.

12. The method of claim 10, further comprising:

transmitting, at the interface, the first set of cell identifiers to the user at a first time;

determining, using the processor, a second set of cell identifiers of the authentication matrix to associate with the user;

transmitting, at the interface, the second set of cell identifiers to the user at a second time; and wherein the first time and the second time are different.

13. The method of claim 10, wherein the first set of cell identifiers expire after a predetermined number of uses.

14. The method of claim 10, further comprising storing, in a memory, the authentication matrix, wherein determining the first set of stored cell values comprises accessing the authentication matrix.

* * * * *